United States Patent [19]

Kalthod

[11] Patent Number: 5,500,036
[45] Date of Patent: Mar. 19, 1996

[54] PRODUCTION OF ENRICHED OXYGEN GAS STREAM UTILIZING HOLLOW FIBER MEMBRANES

[75] Inventor: Dilip G. Kalthod, St. Louis, Mo.

[73] Assignee: Air Products and Chemicals, Inc., Allentown, Pa.

[21] Appl. No.: 323,968

[22] Filed: Oct. 17, 1994

[51] Int. Cl.$^6$ .................... B01D 53/22; B01D 63/02
[52] U.S. Cl. .................... 95/54; 96/8; 96/10
[58] Field of Search .................... 95/45, 51, 52, 95/54; 96/4, 8, 10; 210/321.8, 321.89

[56] References Cited

U.S. PATENT DOCUMENTS

| | | | |
|---|---|---|---|
| 3,499,062 | 3/1970 | Geary et al. | 264/36 |
| 3,536,611 | 10/1970 | DeFilippe et al. | 210/22 |
| 3,930,814 | 1/1976 | Gessner | 95/54 X |
| 4,230,463 | 10/1980 | Henis et al. | 55/16 |
| 4,583,996 | 4/1986 | Sakata et al. | 55/16 |
| 4,666,469 | 5/1987 | Krueger et al. | 95/54 |
| 4,687,578 | 8/1987 | Stookey | 210/321.1 |
| 4,783,201 | 11/1988 | Rice et al. | 55/16 |
| 4,824,444 | 4/1989 | Nomura | 95/54 |
| 4,857,081 | 8/1989 | Taylor | 55/16 |
| 4,900,626 | 2/1990 | Fabre | 428/398 |
| 5,013,437 | 5/1991 | Trimmer et al. | 95/54 X |
| 5,026,479 | 6/1991 | Bikson et al. | 210/321.8 |
| 5,108,464 | 4/1992 | Friesen et al. | 55/16 |
| 5,158,581 | 10/1992 | Coplan | 55/16 |
| 5,158,584 | 10/1992 | Tamura | 95/54 X |
| 5,160,514 | 11/1992 | Newbold et al. | 95/52 X |
| 5,185,014 | 2/1993 | Prasad | 95/54 |
| 5,205,842 | 4/1993 | Prasad | 95/54 X |
| 5,207,906 | 5/1993 | Auvil et al. | 210/321.8 |
| 5,259,869 | 11/1993 | Auvil et al. | 95/52 |
| 5,411,662 | 5/1995 | Nicolas, Jr. et al. | 96/10 X |

FOREIGN PATENT DOCUMENTS

| | | |
|---|---|---|
| 0521784 | 1/1993 | European Pat. Off. . |
| 62-74433 | 4/1987 | Japan . |

*Primary Examiner*—Robert Spitzer
*Attorney, Agent, or Firm*—Mark L. Rodgers; Martha A. Michaels; William F. Marsh

[57] ABSTRACT

The present invention relates to a process and an apparatus for providing an enriched oxygen gas stream. A countercurrent sweep gas stream is provided to the permeate side of the hollow fiber membranes internally of a gas separation module.

13 Claims, 2 Drawing Sheets

PRODUCTION OF ENRICHED OXYGEN GAS STREAM UTILIZING HOLLOW FIBER MEMBRANES

FIELD OF THE INVENTION

The present invention relates to an apparatus and process for providing an enriched oxygen gas stream, wherein the apparatus is comprised of hollow fiber membranes. More particularly, the invention relates to a membrane gas separation module which provides an internal countercurrent sweep for preparing an enriched oxygen gas stream and processes for using the module.

BACKGROUND OF THE INVENTION

It is known to separate one or more components of a gaseous mixture by using a membrane which is more permeable to the one or more components of the mixture. The gaseous mixtures are brought into contact with one side of the membrane with a pressure differential being maintained across the membrane. Thus, a permeable gas will permeate the membrane to the other side thereof, and, thereby, becomes separated from the gaseous mixture.

In the present instance, oxygen or other rapidly permeating gases, such as carbon dioxide, are separated from other slower permeating gases to produce a gas stream enriched in the rapidly permeating gas. The flow rate of the permeate enriched in the rapidly permeating gas (the desired product) depends upon the permeation rate of the rapidly permeating gas. In the membranes which have low permeation rates, the product flow rate (or productivity) will be correspondingly low. It is an object of the present invention to provide a method for increasing the driving force for permeation of the rapidly permeating gas species and thereby increase its permeation rate and hence the productivity.

Several attempts have been made to provide sweep gas to the permeate side of the membrane so as to allow more of the water and, hence, oxygen to permeate the membrane. For instance, in U.S. Pat. No. 3,536,611, a membrane device is disclosed which uses a sweep stream to sweep a permeated fluid from a bundle of hollow fiber membranes through which the fluid is permeated. The sweep streams are brought in from opposite ends of the bundle of fibers, and it is obvious that exterior piping valves, etc. are required for directing the sweep streams into the device. Such piping and valves are costly and provide opportunities for the gas streams to go awry.

In Japanese Application No. 62-74433, feed gas is added by exterior sources to the feed gas side of the membrane either as a co-current flow or by utilizing external piping and valves. Such piping and valving adds to the cost and complexity of the system.

In U.S. Pat. No. 4,687,578, a major portion of the fiber length is coated, such that the water does not speedily penetrate the fibers, and the remaining fiber length at the non-permeate end of the module is not coated or is only partially coated, wherein the gas permeates rapidly, and, therefore, provides a sweep gas in the module. However, this method is only suitable for using the non-permeate gas to provide a countercurrent sweep over the length of the module.

In U.S. Pat. No. 4,783,201, the membrane was not coated, and in an attempt to allow the water to pass rapidly through the membranes, controlled porosity of the membranes was effected. Here again, a procedure was required to treat the hollow fiber membrane material by a means other than that normally used in production lines. Again, this method is only suitable for using the non-permeate gas to provide a countercurrent sweep over the length of the module.

In the ordinary production of hollow fiber membranes for gas separation modules, the fiber is generally post-treated with a coating material, as defined in U.S. Pat. No. 4,230,463, to correct the defects in the membrane in the form of larger pores which would otherwise allow gas to pass through without the selectivity of the membrane separation. Such membranes which have been treated for defect repair may have low oxygen permeation rates and hence, produce low product flow in oxygen-enriched gas processes, because no method of satisfactorily providing the sweep gas had been provided. The previous methods were inadequate and uneconomical or unsuitable.

The present invention provides a hollow fiber membrane module which provides adequate sweep gas in an economical and easily-produced method.

SUMMARY OF THE INVENTION

The present invention provides a membrane gas separation module, having a countercurrent sweep of feed gas provided internally of the module. The method involves using a portion of the feed gas to sweep the permeate side of the membrane module. The sweep portion of the feed is directed through one or more hollow fibers (embedded in the feed or non-permeate end seal) toward the non-permeate end of the module, thus providing a sweep on the permeate side internal of the module. The module is comprised of an elongated shell, having a feed gas inlet, and a non-permeate outlet at substantially opposite ends of the shell, and a permeate outlet appropriately located. The shell contains hollow fiber membranes positioned so as to extend from a first tube sheet near the feed gas inlet to a second tube sheet near the non-permeate outlet. Each end of the hollow fibers terminating in and penetrating a tube sheet. The feed gas contacts the hollow fiber membranes at the feed gas inlet. The feed gas initially contacts either the bores of the fibers (bore side feed) or the exterior of the fibers (shell side feed). At least one of the hollow fiber membranes is shortened so that the feed gas entering that hollow fiber flows onto the permeate side of the fibers in the module and, hence, provides a countercurrent sweep to the permeate side of the hollow fibers. The shortened fiber is sufficiently long to extend from one tube sheet at least 70% of the distance between the one tube sheet and the second tube sheet. The feed gas enters the permeate side of the hollow fiber membranes through the end of the shortened fiber, and creates a sweep on the permeate side countercurrent to the flow of the feed gas.

When the feed gas contacts the bore side of the fibers, the shortened fibers are embedded in the feed end seal of the module and extend toward the non-permeate end of the module. Thus the feed gas entering the bore side of the shortened fibers exits to the shell side of the remaining fibers and hence creates a permeate countercurrent sweep.

On the other hand, when the feed gas contacts the shell side of the fibers, the shortened fibers are embedded in the non-permeate end seal of the module and extend toward the feed gas end of the module. The feed gas enters the bores of the shortened fibers and at the non-permeate end of the module transfers to the bores of the remaining fibers, thus providing a countercurrent sweep on the permeate side.

By providing this countercurrent sweep internally of the module, the faster permeating species, such as oxygen, water, and carbon dioxide, more readily permeate the fibers and a permeate stream enriched in oxygen and other faster permeating species is formed. The module and process of the present invention are particularly suitable for production of enriched oxygen streams containing from about 25% to about 50% oxygen. The number of shortened fibers required and the length of the fibers are easily determined for the particular oxygen-enriched gas product required.

DETAILED DESCRIPTION OF THE INVENTION

Figure 1:
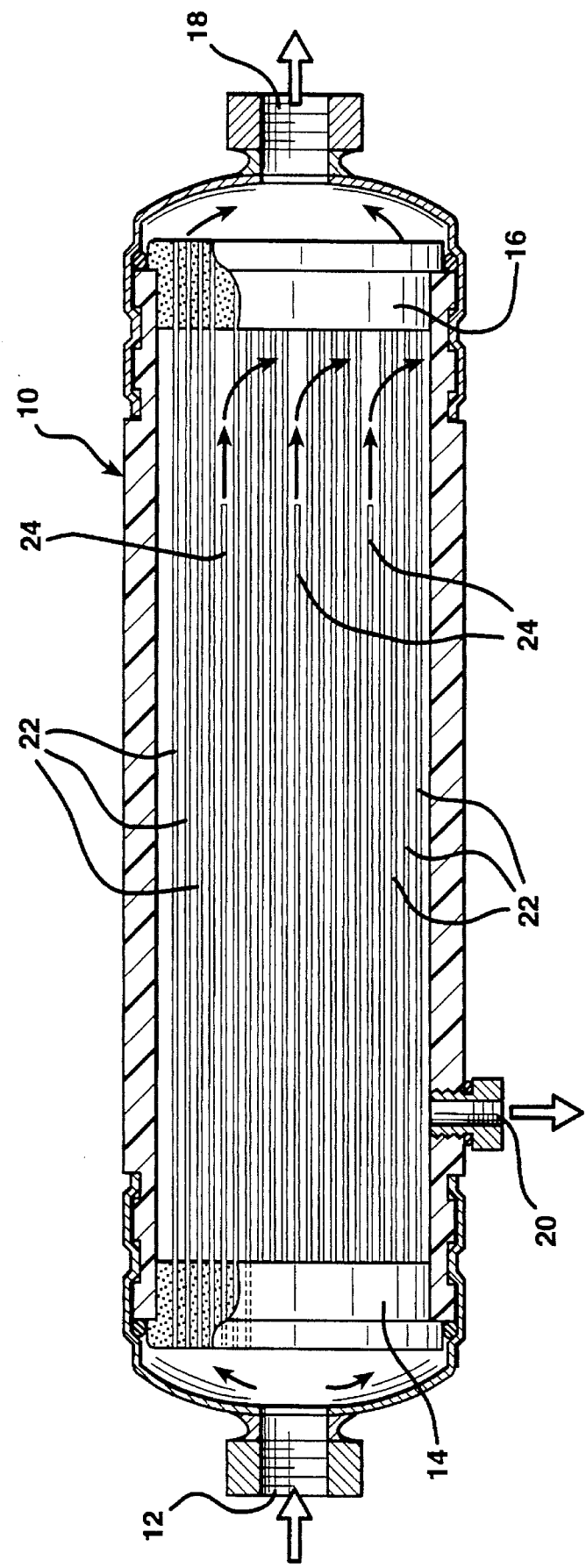
FIG. 1 is an elevational view partially fragmented of one embodiment of the present invention.

With respect to FIG. 1, a gas separation module 10 is provided where the feed gas containing at least about 15% oxygen enters the bores of the hollow fibers 22 under pressure through an inlet port 12 at the face of the first tube sheet 14. The feed gas entering the shortened fibers 24 exits those fibers in contact with the exterior of the hollow fiber membranes 22. The feed gas exiting the fibers 24 reverses to provide a countercurrent sweep gas within the module 10. A non-permeate gas depleted in oxygen and other faster permeating species exits the module at an exit port 18, having continued through the module inside the bores of the hollow fibers 22 through a second tube sheet 16. The permeate gas containing a portion of the feed gas as sweep gas exits the module at an exit port 20. The permeate gas is an oxygen-enriched gas.

Provision of the short fibers 24 extending from the tube sheet 14 allows a predetermined portion of the feed gas to exit those shortened fibers and return on the exterior of the fibers as a permeate sweep. It is preferred that the shortened fibers exceed 70% in length of the distance between the first tube sheet and the second tube sheet. Most preferably, the fibers will extend in length from about 90% to about 99% of the total distance between the tube sheets. Determination of the length of the fibers and the number of fibers is easily ascertained for each oxygen-enriched product. The location for sweep introduction is selected so that the local fluxing oxygen concentration of the permeate is greater than or equal to the oxygen concentration in the feed gas. This determines the length of the short fibers. The amount of feed injected as sweep is controlled by the number of the shortened fibers, their length and the bore diameter as well as the operating pressure of the process. This number is selected so as to obtain the desired productivity or to maximize the productivity. In a preferred embodiment, the shortened fibers are distributed throughout the hollow fiber bundle in order to obtain uniformity of sweep distribution. The number of fibers to be used will typically be determined by measuring the flow rate through a single fiber of the selected length and bore diameter, and from that, determining the number of fibers needed for a particular required sweep flow rate. Once the module has been assembled, it is operated to produce a specific preselected concentration of oxygen in the permeate. This level is achieved by adjusting the non-permeate flow rate until the permeate reaches the desired oxygen level.

Figure 2:
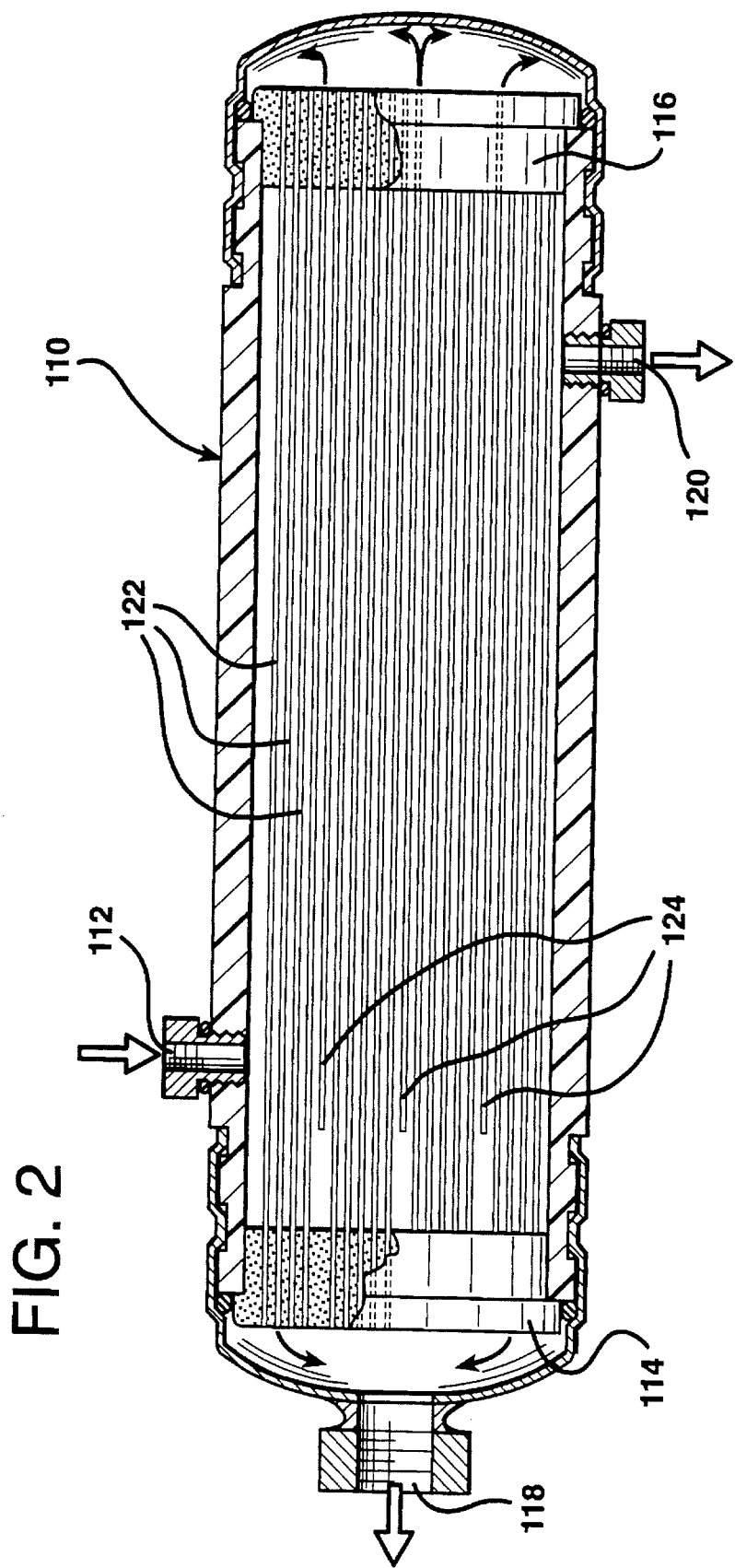
FIG. 2 is an elevational view partially fragmented of another embodiment of the present invention.

With respect to FIG. 2, a gas separation module 110 is provided where the feed gas, having an oxygen content of at least 15%, enters the shell side of the hollow fibers 122 under pressure through an inlet port 112 near the first tube sheet 114. A portion of the gas permeates the fibers 122 into the fiber bores and the permeate enriched in oxygen exits the module 110 at an exit port 118. The non-permeate feed gas depleted in oxygen remains on the shell side of the hollow fibers 122 and exits the module 110 at an exit port 120. The shortened fibers 124 receive the feed gas in the bores of the fibers 124 and transfer the feed gas to the bores of the other hollow fibers 122 through the end seal 116 of the module simultaneously creating a countercurrent sweep of the permeate, on the bore side of the fibers.

EXAMPLE 1

A module 3 inches in diameter and 2 feet long containing hollow fiber membranes packed at a 50% density is used to produce a permeate containing 30% oxygen from air where the feed air is at 30 psig. The fibers have an outside dimension of 460 microns and an inside dimension of 220 microns. The oxygen-to-nitrogen selectivity is 5.6 at 30° C. The active membrane area is 130 square feet. A computer simulation shows that without any shortened fibers to provide a permeate sweep, a 30% oxygen product is obtained at a flow rate of 0.35 scfm (standard cubic feet per minute). The recovery ratio (permeate/feed) is 65%.

When shortened fibers are used to inject 27% of the feed air as sweep close to the non-permeate end of the module, a product containing 30% oxygen is obtained at a flow rate of 1.24 scfm. This indicates an increase of more than three times the rate of productivity compared to when there is no feed air used as sweep. The recovery ratio is 41%. The results are summarized in Table 1 below.

TABLE 1

| SWEEP/ FEED % | PERMEATE OXYGEN % | PERMEATE FLOW SCFM | RECOVERY PERMEATE/ FEED % | OXYGEN FLOW SCFM |
| --- | --- | --- | --- | --- |
| 0 | 30 | 0.35 | 65 | 0.11 |
| 27 | 30 | 1.24 | 41 | 0.37 |

EXAMPLE 2

A 4"×3' double-ended bore-feed module containing 330 square feet of active fiber area is provided. The module is provided with "short" hollow fibers ("sweep fibers") to inject part of the feed as sweep on the permeate side. The sweep fibers terminate just short of the non-permeate end seal.

The module is operated at 30° C. with an air feed at 60 psig. The feed flows through the bores and the permeate through the shell in a countercurrent flow mode. The module is operated to produce 35% oxygen in the permeate by adjusting the non-permeate flow rate until the permeate reaches the desired oxygen level. The results of computer simulations appear in Table 2 below.

TABLE 2

| SWEEP FLOW SCFM | SWEEP/ FEED % | PERMEATE FLOW SCFM | NON-PERMEATE FLOW SCFM | RECOVERY PERMEATE/ FEED % | OXYGEN FLOW SCFM |
| --- | --- | --- | --- | --- | --- |
| 0 | 0 | 1.87 | 1.63 | 53 | 0.65 |
| 0.5 | 10 | 2.45 | 2.55 | 49 | 0.86 |
| 0.975 | 15 | 3.00 | 3.50 | 46 | 1.05 |

The above results indicate that the productivity of the module for 35% oxygen can be increased by 60% if the number of shortened fibers selected produces a sweep flow of 0.975 scfm; this also causes a drop in the recovery ratio from 53% to 46%.

EXAMPLE 3

A module is constructed in a similar manner to that of Example 2, except that the feed is to the shell side of the fibers as shown in FIG. 2 and there is an active fiber area of 460 square feet. Under operating conditions of a temperature at 30° C. and feed air at 60 psig, the module is operated to produce 35% oxygen and 40% oxygen in the permeate. The separation factor for oxygen-to-nitrogen of the hollow fiber membranes is 7.0. The non-permeate flow rate is adjusted until the permeate reaches the desired oxygen level. The results of computer simulations are in Table 3 below.

feed air is supplied at a pressure of 60 psig. The results of computer simulations are shown in Table 4.

Table 4 below is in two parts. In the first part, the sweep flow is 1.4 scfm. In this part, it is the objective to show the effect of the non-permeate flow on the permeate oxygen concentration. Primarily, it is the object of the example to produce oxygen at a content of about 35% in the permeate stream. The second part of Table 4 shows the effect of the non-permeate flow where there is no sweep flow. In the module with zero sweep, the oxygen concentration increases sharply as the non-permeate flow rate increases. Therefore control of permeate oxygen concentration is more difficult. In comparison, for the module with sweep, the permeate oxygen concentration increases more gradually as the non-permeate flow rate increases. This allows more accurate control of the permeate oxygen concentration.

TABLE 3

| SWEEP FLOW SCFM | SWEEP/ FEED % | PERMEATE OXYGEN % | PERMEATE FLOW SCFM | NON-PERMEATE FLOW SCFM | RECOVERY PERMEATE/ FEED % | OXYGEN FLOW SCFM |
| --- | --- | --- | --- | --- | --- | --- |
| 0 | 0 | 35 | 0.848 | 0.652 | 57 | 0.30 |
| 0 | 0 | 40 | 0.908 | 1.24 | 42 | 0.36 |
| 0.212 | 10 | 35 | 1.10 | 1.02 | 52 | 0.39 |
| 0.40 | 10 | 40 | 1.40 | 2.60 | 35 | 0.56 |
| 1.40 | 20 | 35 | 2.49 | 4.51 | 36 | 0.87 |

The above results indicate that the productivity of the module for 35% oxygen can be increased 2.9 fold if the number of shortened fibers selected produces a sweep flow of 1.40 scfm. If the module is operated to produce 40% oxygen, its productivity can be increased by 54% if the number of sweep filaments used produces a sweep flow of 0.40 scfm.

EXAMPLE 4

The same module used in Example 3 is used in this example where the operating conditions are 30° C. and a Hence, the feed-swept module with the appropriate sweep flow rate shows less variation in the oxygen production with the changing non-permeate flow than does the non-sweep module. Thus, with the sweep, the desired oxygen rate is better controlled with higher accuracy and less drift by use of a properly designed module having a feed sweep.

TABLE 4

| SWEEP FLOW = 1.40 SCFM | | | SWEEP FLOW = 0.00 | | |
| --- | --- | --- | --- | --- | --- |
| NON-PERMEATE FLOW SCFM | PERMEATE OXYGEN % | PERMEATE FLOW SCFM | NON-PERMEATE FLOW SCFM | PERMEATE OXYGEN % | PERMEATE FLOW SCFM |
| 1.64 | 30.4 | 2.36 | 0.646 | 34.4 | 0.854 |
| 2.58 | 32.8 | 2.42 | 1.10 | 39.0 | 0.904 |
| 3.53 | 34.2 | 2.47 | 1.56 | 41.7 | 0.937 |
| 4.51 | 35.1 | 2.49 | 2.04 | 43.5 | 0.960 |
| 5.49 | 35.8 | 2.51 | 3.01 | 45.6 | 0.989 |
| 6.47 | 36.3 | 2.53 | | | |
| 7.46 | 36.7 | 2.54 | | | |
| 8.45 | 37.0 | 2.55 | | | |

EXAMPLE 5

A double-ended, bore-feed module, 4"×3', containing 330 square feet of active fiber area is used in this Example. The module is operated with air at 15 psig on the feed side and the permeate port is connected to a vacuum pump drawing the pressure down to 2 psia at the permeate exit port. The non-permeate flow rate is adjusted to produce 35% oxygen in the permeate stream. Four different modules, each with a different number of "sweep fibers", are used. The corresponding sweep flow rates and the results of the computer simulations are shown below in Table 5.

TABLE 5

| MODULE NO. | SWEEP FLOW scfm | FEED FLOW scfm | 35%$O_2$ PERMEATE FLOW scfm | PERMEATE/ FEED % |
| --- | --- | --- | --- | --- |
| 1 | 0 | 1.42 | 0.809 | 57.0 |
| 2 | 0.50 | 2.76 | 1.39 | 50.4 |
| 3 | 0.75 | 3.65 | 1.68 | 46.0 |
| 4 | 1.00 | 4.91 | 1.97 | 40.1 |

The above results show the increased product flow and decreased recovery as the sweep flow rate injected via "sweep fibers" is increased. The optimum sweep flow rate will depend upon the needs of a particular application.

I claim:

1. A process for obtaining an oxygen-enriched gas stream from a gas containing at least about 15% oxygen comprising:
   (a) contacting the gas with hollow fiber membranes contained in a pressure module to provide a feed gas internally of the module;
   (b) permeating a major portion of the oxygen in the feed gas through the membranes;
   (c) utilizing a portion of the feed gas derived internally of the module to provide a sweep gas internally of the module to the permeate side of the hollow fiber membranes substantially countercurrent to the flow of the feed gas; and
   (d) recovering an oxygen-enriched permeate gas stream.

2. The process of claim 1 wherein the oxygen-enriched gas stream contains from about 25% to about 50% oxygen.

3. The process according to claim 1 wherein the sweep gas is from about 2% to about 50% of the feed gas.

4. The process according to claim 3 wherein the sweep gas is from about 10% to about 30% of the feed gas.

5. The process according to claim 1 wherein the feed gas is at a pressure of at least 1 atmosphere.

6. The process according to claim 1 wherein the feed gas is comprised of ambient air.

7. The process of claim 1 wherein the feed gas contacts the bore side of the fibers.

8. The process of claim 1 wherein the feed gas contacts the shell side of the fibers.

9. A membrane gas separation module particularly suitable for production of an enriched oxygen gas stream from a feed gas containing at least 15% oxygen, having a countercurrent sweep of the permeate side by feed gas provided internally of the module comprising:
   (a) an elongated shell having a feed gas inlet to the hollow fiber membranes at one end and a non-permeate outlet at substantially the opposite end of the shell, and an appropriately-placed permeate outlet, the shell containing
   (b) hollow fiber membranes positioned in the shell extending from a first tube sheet near the feed gas inlet to a second tube sheet near the non-permeate outlet, each end of the hollow fiber membranes terminating in and penetrating a tube sheet; and
   (c) at least one shortened hollow fiber penetrating only one of the two tube sheets and extending at least about 70% of the length of the distance between the tube sheets to provide a portion of the feed gas to the permeate side of the hollow fibers as countercurrent sweep.

10. The module of claim 9 wherein the at least one shortened hollow fiber extends from about 90% to about 99% of the length of the distance between the tube sheets.

11. The module of claim 10 wherein the at least one shortened hollow fiber is a plurality of shortened hollow fibers.

12. The module of claim 11 wherein the number and diameter of shortened hollow fibers is selected to produce a sweep flow rate which is from about 2% to about 50% of the entering feed gas.

13. The module of claim 11 wherein the shortened hollow fibers are distributed among the hollow fiber membranes positioned in the shell.

* * * * *